(12) United States Patent
Weiss et al.

(10) Patent No.: US 7,415,435 B1
(45) Date of Patent: Aug. 19, 2008

(54) QUOTATION MECHANISM FOR SERVICE ENVIRONMENTS

(75) Inventors: Michael Weiss, Ottawa (CA); Tom Gray, Carp (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 0 days.

(21) Appl. No.: 09/566,049

(22) Filed: May 5, 2000

(30) Foreign Application Priority Data

May 5, 1999 (GB) ................................ 9910210.5

(51) Int. Cl.
*G06Q 40/00* (2006.01)
(52) U.S. Cl. ............................. 705/37; 705/26; 705/35
(58) Field of Classification Search ................ 705/26, 705/27, 7, 8, 9, 10, 37; 358/1.15, 1.18
See application file for complete search history.

(56) References Cited

U.S. PATENT DOCUMENTS

| | | | | |
|---|---|---|---|---|
| 5,331,546 A | * | 7/1994 | Webber et al. ................. | 705/6 |
| 5,592,375 A | * | 1/1997 | Salmon et al. ................. | 705/7 |
| 5,659,601 A | * | 8/1997 | Cheslog ................. | 379/121.02 |
| 5,703,949 A | * | 12/1997 | Rosen ......................... | 705/65 |
| 5,758,328 A | * | 5/1998 | Giovannoli ................... | 705/26 |
| 5,809,492 A | * | 9/1998 | Murray et al. ................ | 706/45 |
| 5,826,244 A | * | 10/1998 | Huberman .................... | 705/37 |
| 5,842,178 A | * | 11/1998 | Giovannoli ................... | 705/26 |
| 5,983,092 A | * | 11/1999 | Whinnett et al. ............. | 455/406 |
| 6,081,789 A | * | 6/2000 | Purcell ........................ | 705/37 |
| 6,119,101 A | * | 9/2000 | Peckover ..................... | 705/26 |
| 6,192,364 B1 | * | 2/2001 | Baclawski ................... | 707/10 |
| 6,219,692 B1 | * | 4/2001 | Stiles ......................... | 709/201 |
| 6,226,377 B1 | * | 5/2001 | Donaghue, Jr. ............. | 379/265 |
| 6,272,472 B1 | * | 8/2001 | Danneels et al. ............. | 705/27 |
| 6,330,542 B1 | * | 12/2001 | Sevcik et al. ................. | 705/8 |
| 6,397,197 B1 | * | 5/2002 | Gindlesperger ............. | 705/37 |
| 6,650,433 B1 | * | 11/2003 | Keane et al. ............... | 358/1.15 |

(Continued)

FOREIGN PATENT DOCUMENTS

GB 2313256 A 11/1997

(Continued)

OTHER PUBLICATIONS

Internet website of Priceline.com expanding "Name Your Own Price." Press Release Archive, Jul. 6, 1998.*

(Continued)

*Primary Examiner*—F. Zeender
*Assistant Examiner*—M. Thein (57) ABSTRACT

The present invention provides a quotation mechanism for service environments where the service level is negotiated. A client makes a request for a type, quality or volume of service. The service provider provides a response in the form of a quote. A quote binds the service provider to providing a service at a specified price. The quote also contains parameters of type, quality, or volume of service that the service provider can provide at that price. The client, after evaluating the quote, can either accept or reject a quote. The client can also obtain quotes from multiple service providers and enter a service contract with the service provider of its choice. This choice will not be based solely on price, but also on the levels of service quoted, since the service provider might not be able to supply the service at the requested level.

7 Claims, 8 Drawing Sheets

U.S. PATENT DOCUMENTS 6,985,882 B1 * 1/2006 Del Sesto ............... 705/37
2001/0049632 A1 * 12/2001 Rigole ................ 705/26

FOREIGN PATENT DOCUMENTS

| JP | 2-178795 | * | 7/1990 |
| WO | WO92/11596 A1 | | 7/1992 |
| WO | WO93/24892 A1 | | 12/1993 |
| WO | WO 97/29443 | | 8/1997 |
| WO | WO97/31322 | | 8/1997 |

OTHER PUBLICATIONS

O Leary, Mick "Microsoft Network: a Survey of Business Resources", V19n2, pp. 95-97 Apr./May 1996.*

K. Holtman et al, "HTTP Remote Variant Selection Algorithm", published Mar. 1998, Network Working Group Request for Comments: 2296.

"Informacio Elektronika" published 1980, vol. 15, No. 3, pp. 160-165, Sugar, P., "Resource allocation in distributed computer networks".

* cited by examiner

QUOTATION MECHANISM FOR SERVICE ENVIRONMENTS

FIELD OF THE INVENTION

The present invention relates generally to the field of electronic communication and computer systems and more particularly to a quotation mechanism for service environments for the provisioning of services. The present invention provides a structured method for negotiating and providing a service in response to a client's request.

BACKGROUND OF THE INVENTION

Service environments are characterized by having two parties: an entity or client that desires the performance of a service; and the service provider who provides the service. In most general terms, a client desirous of a service can be a human, computer program or application, or a device. Likewise, a service provider can be a human, a computer program or application, or a device. A service can be provided at various capacities, levels, or qualities such as speed, reliability, volume, response time etc. In the context of an electronic environment, a service can be viewed as work performed or offered by an application or device as the service provider. It is typically defined in terms of a service state and a set of operations that can be invoked on the service provider. For example, a printer may provide a "printing" service, its state comprising whether the printer is online or offline and its operations being "print file" and "get queue length". In service environments, services are typically shared among clients and are typically available from multiple service providers. In addition, service providers frequently provide not equal, but equivalent or overlapping services or a range of services. When a client is desirous of the performance of a service, the problem arises that a particular service provider may not be able to provide the exact service as desired. This can be for such reasons as the service is currently allocated to another client, or the exact service is not available from that particular service provider. However, frequently the service provider has alternative services that may meet the needs of the client, although they may not have the exact features that the client requested. Consequently, the client is turned away from that particular service provider and in situations where there is only one service provider available, the needs of the client remain unsatisfied. In addition, frequently similar services are provided by multiple service providers, although no appropriate method exists for efficiently choosing among overlapping services of multiple service providers.

Consequently, there is a need for a mechanism that would allow for a client to negotiate and choose an appropriate service from a service provider offering multiple levels of service. There is also a need for a mechanism to choose efficiently from a number of service providers in a service environment.

Smith, R. G. and Davis R. have disclosed a system called "Contract Net" in a document entitled "Frameworks for Cooperation in Distributed Problem Solving", IEEE Trans. On Systems, Man and Cybernetics, 1981, pp. 61-70. In the Contract Net system, contracts are established as an explicit agreement between a manager process guaranteeing a task and a contractor process willing to execute the task. A negotiation protocol is used to establish the contract where the manager process advertises the task to be performed to all potential contractors. The contractors, in turn, submit bids. A contract is established between the manager and the lowest bidder. However, the Contract Net system does not explicitly make use of quotes at multiple levels of service. If the task cannot be exactly performed as advertised, the contractor does not submit a bid, even though resources may be available that could meet the desired needs.

Anna-Lena Neches has disclosed a system called FAST (http://info.broker.isi.edu:80/fast) as a procurement service using Electronic Data Interchange (EDI). FAST is a electronic purchasing agent with access to a broad spectrum of distributors and manufacturers. Customers send quote requests and orders to FAST via electronic mail (email). When an electronic quote request is received, FAST obtains quotes from its vendors and returns them to the customer via email. As presently constructed, FAST does not support a negotiation of various levels of service between buyer and seller, such as would be necessary for large volume purchasing contracts. The FAST system is restricted to the application domain of electronic markets.

Other Quality of Service (QOS) negotiation mechanisms have been used for the negotiation for service quality in broadband systems as discussed in "Distributed Multimedia and QOS: A Survey", Andreas Vogel, Brigette Kerherue, Gregor von Bochmann and Jan Gecsei, IEEE Multimedia, Summer 1995, pp. 10-19. Some of these are based on brokerage mechanisms, however, they (1) do not provide sophisticated quotation mechanisms, and (2) are restricted in their application to the domain of distributed multimedia systems, that is, the QOS parameters are restricted to the quality of data transmission and data representation.

In another prior art system, the Trading Service of the Common Object Request Broker Architecture (CORBA) (reference: OMG, CORBA Services: Object Management Architecture Guide, 1997) provides means for advertising services to a repository and to query the repository by service properties. While service queries to the Trading Service of CORBA can impose constraints on the properties of the disclosed service, the Trading Service neither supports the notion of service level, nor does it associate a cost with providing a service. Furthermore, negotiation is not used to arrive at the service offer, rather it is up to the client to reissue a modified service request (for example, by removing required service properties or relaxing their values) if none of the service providers can meet the constraints.

SUMMARY OF THE INVENTION

The present invention provides a quotation mechanism for service environments where the service level is negotiated. A client makes a request for a type, quality or volume of service. The service provider provides a response in the form of a quote. A quote binds the service provider to providing a service at a specified price. The quote also contains parameters of type, quality, or volume of service that the service provider can provide at that price. The client, after evaluating the quote, can either accept or reject a quote. The client can also obtain quotes from multiple service providers and enter a service contract with the service provider of its choice. This choice will not be based solely on price, but also on the levels of service quoted, since the service provider might not be able to supply the service at the requested level.

According to one aspect of the present invention there is provided a method for negotiating and providing an electronic service in a service environment of clients and electronic service providers comprising the steps of:
(a) a client generating an electronic request message for service at a specified price;
(b) said client sending said request message to said service provider;

(c) said service provider generating a digital subsumption hierarchy of multiple service levels of said electronic service expressed in digital notation, wherein any one of said service levels subsumes any other one of said service levels provided that said one of said service levels offers at least the same quality of service as said other one of said service levels;

(d) said service provider generating an electronic quote message in response to said request, said quote message containing data representing the highest one of said service levels of which said service provides is capable of delivering at said specified price;

(e) sending said quote message to said client;

(f) said client evaluating said quote message to generate a decision;

(g) sending one of either a positive or negative notification message of said decision to said service provider; and (h) said service provider providing said electronic service upon receipt of said positive notification message.

According to another aspect of the present invention there is provided a method for generating a negotiation mechanism for service environments comprising the steps of:

(a) identifying one or more clients;

(b) identifying one or more electronic service providers;

(c) generating an electronic definition of services expressed in digital notation;

(d) educating said clients with said definition of services;

(e) educating said electronic service providers with said definition of services;

(f) generating an electronic definition of service features expressed in digital notation for each of said services;

(g) educating said clients and said electronic service providers with said definition of said service features;

(h) defining a request message format, quote message format, and notification message format for a request, quote and notification, respectively;

(i) identifying an electronic device to provide each said service;

(j) defining one or more service levels expressed in digital notation relating to said device;

(k) attaching said electronic device to said electronic service provider;

(l) educating said electronic service provider with said service levels;

(m) said service provider generating a subsumption hierarchy of said service levels expressed in digital notation; and (n) opening a communications channel between said client and said electronic service provider for sending said request, quote and notification.

DETAILED DESCRIPTION OF THE PREFERRED EMBODIMENT

Figure 1:
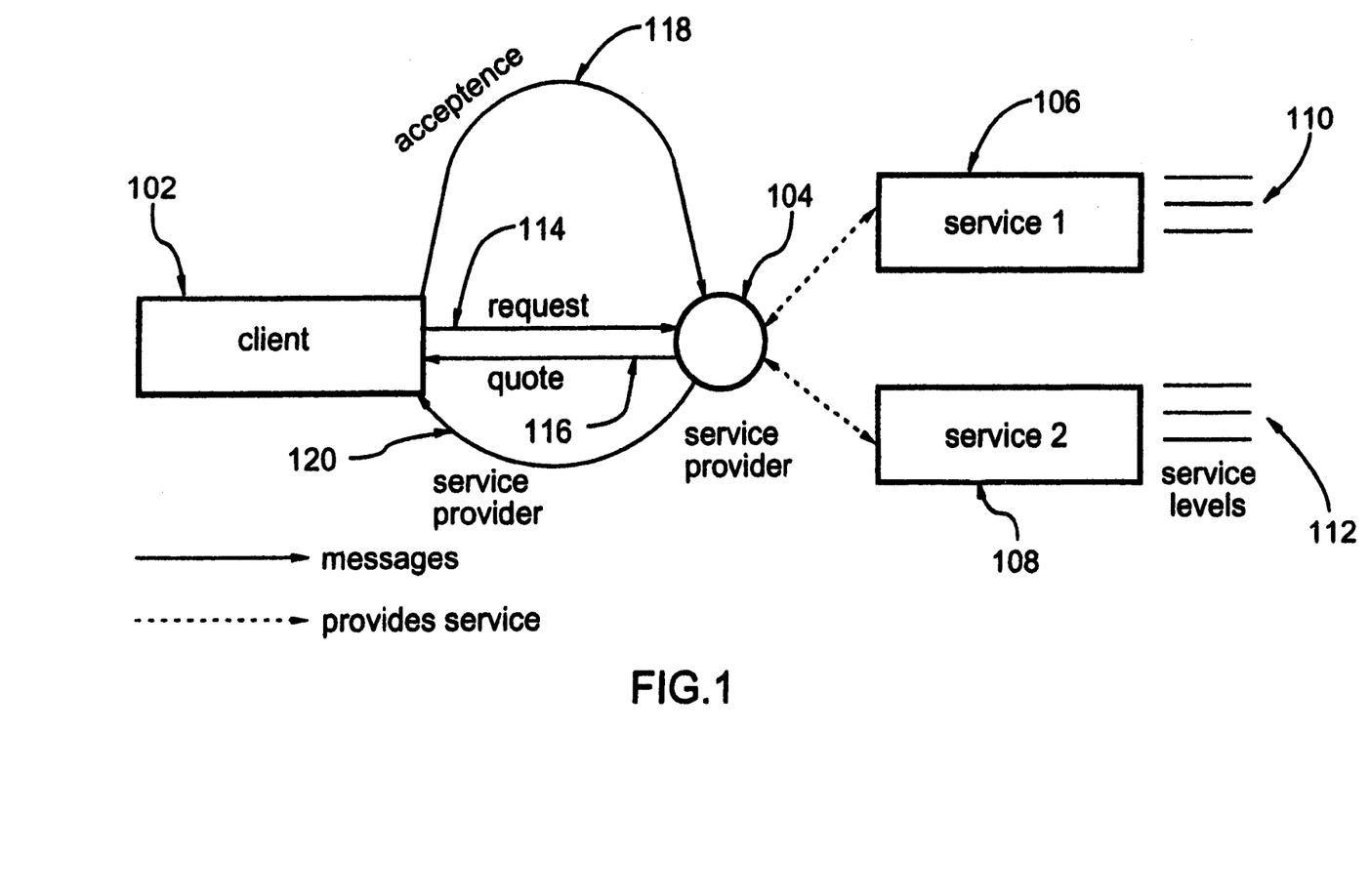
FIG. 1 is a block diagram illustrating the interaction between a client and a service provider utilizing the quotation mechanism of the present invention.

Turning to FIG. 1, the interaction between the client and a service provider utilizing the quotation mechanism of the present invention is illustrated. The present invention in utilized in a service environment characterized by having a client 102 that desires the performance of a service and a service provider 104 that provides the service. The client 102 can be a human, computer program or application, or a device. In the preferred embodiment, the service provider 104 can be a computer program or application resource, or a device. The service provider 104 can offer one or more different services, such as service 106 and service 108. The services which can be provided are not limited by the invention and can be generic and wide ranging, such as printing, communications, etc. Each service, such as service 106 and service 108, is offered at one or more service levels as illustrated by service levels 110 and 112 corresponding to service levels 106 and 108 respectively. The levels of service as illustrated by service levels 110 and 112 can vary in terms of any parameter in which the service can be provided, such as capacity, quality, speed, reliability, volume, response time, etc. Service provider 104 may provide services to one or more clients 102.

To utilize the present invention, a definition and initialization must be performed.

Service Definition

This is comprised of the definition of the service (e.g. 106 and 108) which is to be performed by the service provider 104. For example, this includes naming the different services such as printing, communications, faxing etc. that can be performed by service providers 104 or requested by a client 102. These service definitions can be endowed into the client 102 or service provider 104 when the system is initialized, or alternatively, can be added dynamically to the client 102 or service provider 104. During service definition, the client 102 is informed and made aware of the various services available to it. In a similar manner, the service provider 104 is educated or endowed with the definition of the services it provides. A communications protocol for communication between a client 102 and service provider 104 regarding the structure of a request for a service, and the structure of a quote, the structure of an acceptance and rejection, is also endowed or provided to both the client 102 and service provider 104. Client 102 also endowed or dynamically provided units of a currency to purchase services. Client 102 is also endowed with a reasoning mechanism to choose services based on evaluation of certain criteria such as lowest price, highest quality etc.

Service Feature Definition

Once the services have been defined, the features of each service must be defined. The service feature definition sets out the various parameters of the service which can be requested by a client 102 or be provided by a service provider 104. For example, this includes quality, capacity, speed, reliability, etc. The service feature definition facilitates the creation of various service levels of the service (such as service 106 and 108) by varying, for example, the quality at which the service can be performed. There is no limit on the features which can be provided, as this is dependent on the capabilities of service provider 104 and the nature of the service. The various features of a service can either be endowed into a client 102 or service provider 104, or be dynamically added, reconfigured, or modified in real time.

Device and Service Attachment

Multiple services such as 106 and 108 can be attached to any service provider 104. During the initialization or reconfiguration of a service, the specific service (e.g. 106 or 108) is attached to the service provider 104. This includes attaching of the devices or subservices as necessary to provide the service. Each device or subservice has one or more service levels 110 and 112 which is associated with each of service 106 and 108 respectively. The service levels 110 and 112 of services 106 and 108 respectively can be added, modified or deleted, at startup or dynamically at run time.

Creation of Subsumption Hierarchy

Once the service provider 104 has been established with specific services such as 106 and 108 that can offered at different service levels, the service provider 104 creates a subsumption hierarchy. The subsumption hierarchy allows the service provider to evaluate the service levels 110 and 112 of services 106 and 108 so that it can respond to a client request. This is described in further detail with respect to FIG. 4. The subsumption hierarchy can be created at initialization of the service provider after the services are attached, or can be dynamically created or modified as service levels change. The service provider 104 also assigns a price to each service level of each service 106 and 108.

Communications Channel

Once the subsumption hierarchy is created, a communications channel must be opened between the client 102 and service provider 104 so that the client 102 and service provider 104 are able to communicate to send requests, quotes and exchange information necessary to perform the services. This communication can be done using the predefined protocol using well known communication means such as broadcast, bulletin board, etc. When the communications channel is open, the client is made aware of the presence of one or more service providers and likewise, the service provider is made aware of potential clients.

In the operation of the invention an electronic request is generated (step 2000 of FIG. 8) and the client 102 sends a request 114 to service provider 104 to provide a defined service (step 2002). The client request 114 may include the desired features of the service such as type, quality and volume of service desired. For example, client request 114 may have a message format with fields containing the following: requested service type, service quality and service volume. These fields correspond to the features of the desired service. The request 114 may optionally contain a field of maintenance price. The request 114 message carries a unique request id to be used by the service provider in its reply message. Service provider 104 responds with the quote 116 (step 2006) which is sent to client 102 (step 2008). The quote 116 provides the specification of a particular type, quality and volume of service that can be provided by the service provider 104 in response to the request 114. The service provider's response also contains the price at which it is willing to provide that level of service. For example a quote 116 may have a message format with fields containing the following: request id, price, and optionally fields listing matched features and unmatched features corresponding to request 114. The quote's price is the amount at which the service provider has offered to sell the service and consequently is the price the client has to pay should it decide to purchase the service from the service provider 104. The quote 116 may be for levels of service below or above that which is requested by client 102. If the service can only be provided at a lower level of service, the quote also represents which aspects of the client's requirements could not be satisfied.

Figure 8:
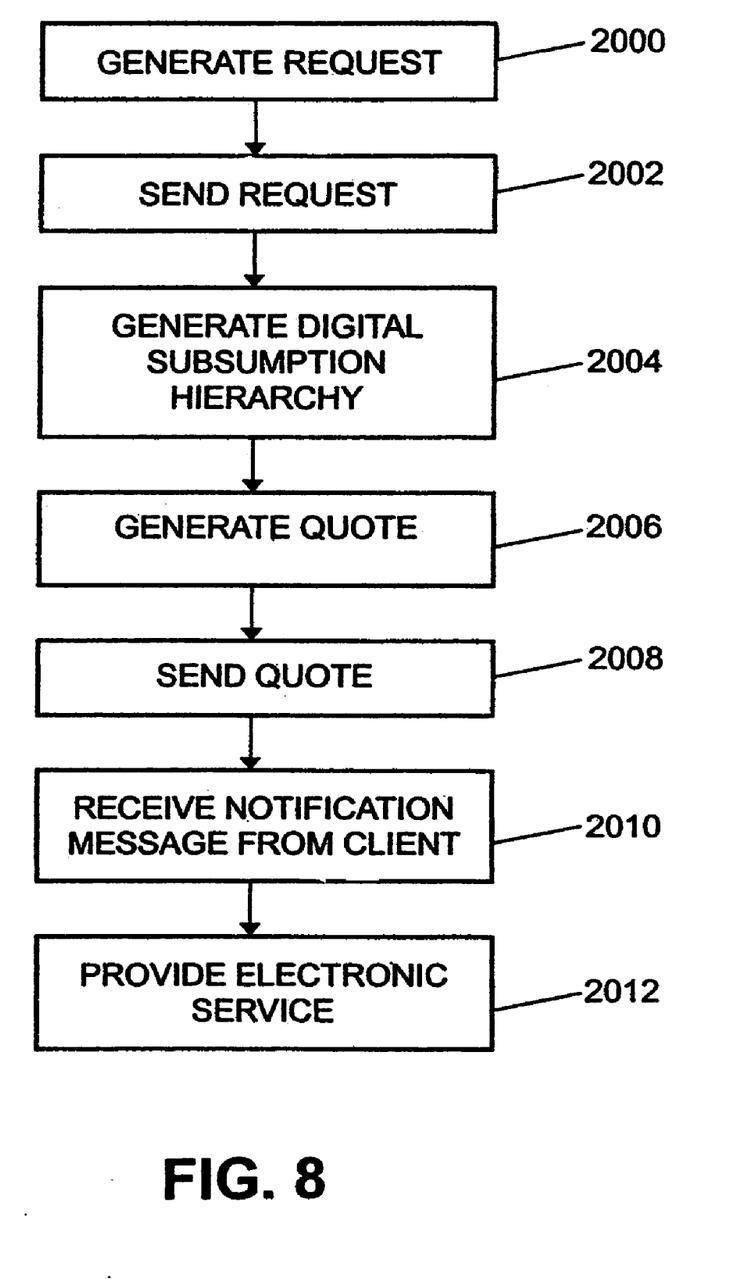
FIG. 8 is a flow chart showing the method steps for providing an electronic service according to an embodiment of the present invention.

The client 102 then evaluates the quote and if the client agrees to the asked price, the client 102 sends an acceptance 118 to service provider 104 (step 2010) and a service contract will be entered; thus the service provider 104 is bound to its offer and must provide the service 120 (step 2012).

Continuing the example, acceptance 118 may simply have a message format containing the field request, id confirming acceptance of the request 114.

One example of the implementation of the present invention is a printing network with several matrix and laser printers in which a request for "printing at draft, immediately" is made by a client. If all matrix printers are blocked, the request cannot be satisfied in the given time constraint. However, if one of the laser printers is available, it could accept the print request instead, effectively printing at letter quality, although at a higher cost. In this example, the service provider would return a quote specifying a supplied price that may be higher than the one the client specified in his request (if the client specified one) and the features or conditions of the service provided where they differ from the client's request. Also, the quote could specify that the print request for draft quality cannot be satisfied, but that the service of printing can be acceptable printed at letter quality using the laser printer at a higher price than at draft quality.

The following is a further example illustrating a request 114 provided in XML (eXtended Markup Language). The XML specification is publicly known and is described in Extensible Markup Language (XML) 1.0, W3C Recommendation, 1998. This example provides a request to print 10 pages at draft resolution and to a printer that isn't currently busy.

<request id="client-1">
  <service-typeoprinting</service-type>
  <service-quality>
    <feature name="resolution" value="draft"/>
    <feature name="delay value"="false"/>
  </service-quality>
  service-volume>10</service-volume>
</request>

This XML specification example above defines an object of type "request" with attributes "service-type", "service-quality" and "service-volume". The "service-quality" attribute itself is defined by a list of "feature" objects. Each "feature" specifies the name and value of a service feature. The values must be from a predefined range. In this case, the value range for the feature "resolution" is {draft, letter} and that for the feature "delay" is Boolean, that is, {true, false}.

As discussed above, a quote 116 may contain the price at which a service provider 104 is willing to provide the service. The quote 116 also lists which features of the service request 114 the service provider 104 could match and which it could not. For each feature, the service level can be optionally included in the message if it is above or below that which was requested. This information may be useful to the client 102 to further rank the quotes received from the various providers.

Continuing the example, the above XML specification example request leads to the two following XML language quotes by the matrix and the laser printer, respectively:

```
<quote id="matrix-2" in-reply-to="client-1">
<cost>1.00</cost>
<Matched-features>
</matched-features>
<unmatched-features>
    <feature name="delay" value="false"/>
</unmatched-features>
</quote>
```

The feature "resolution=draft" could be matched exactly, so there is no entry in matched-features. Such an entry is only made if the feature was oversatisfied, for example in the case of the laser printer described in further detail below. Using its subsumption hierarchy, the service provider for the laser printer determines that the feature "resolution=draft" can be matched by "resolution=letter".

```
<quote id="laser-3" in-reply-to ="client-1">
<cost>3.00</cost>
<matched-features>
    <feature name="resolution" value="letter"/>
    <feature name="delay" value="false"/>
</matched-features>
<unmatched-features>
</unmatched-features>
</quote>
```

As discussed above, an acceptance 118 message is sent if the client 102 agrees to the asked price. In the above example, the following XML language acceptance message is sent to the service provider of the selected laser printer:

```
<acceptance id="client-4" in-reply-to ="laser-3"/>
```

The mechanism of the present invention can be generalized and adopted to any quality of service (QOS) negotiation schemes or scenarios, for example, to agree on the transmission speed between two modems. A QOS represents the set of those qualitative and quantitative characteristics of a service provider to achieve the required function of the client. In particular, it can be adopted to general service environments. Thus the QOS parameters are not restricted to the quality of data transmission and representation but can describe the quality of service provided by any physical device, application or human.

In an alternate embodiment, a client request 114 can also specify a maintenance price that a client is willing to pay for a service at the specified level. This may be used to reduce the number of rounds of the negotiation by authorizing the service provider to quote the best service available at up to the specified price limit. It is not necessary for the service provider to ask for the client's permission each time it modifies its supplied price as long as the supplied price stays below the limit stipulated by the client.

The mechanism by which the client 102 evaluates quotes and makes its decision can be based on parameters such as lowest cost, best quality etc. using existing evaluation schemes which are well known in the art. The invention may be practiced using any evaluation and decision scheme.

Figure 2:
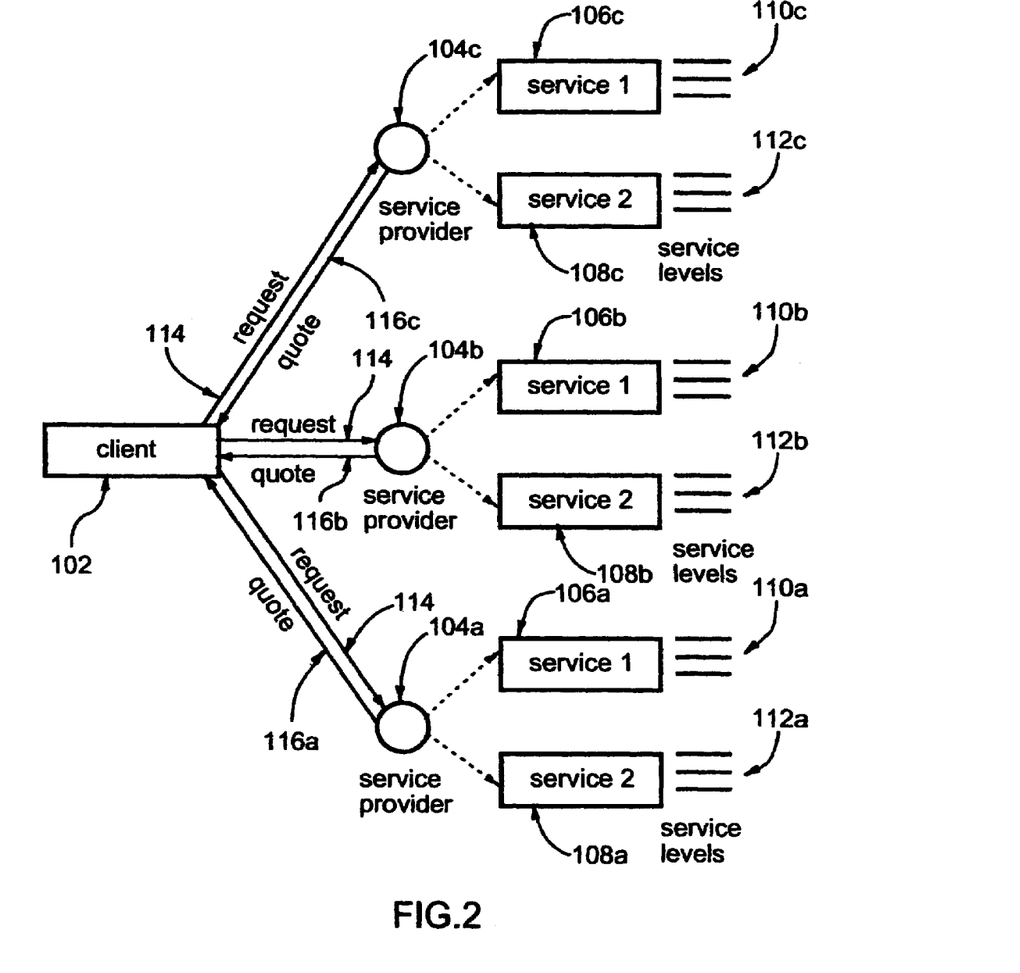
FIG. 2 is a block diagram illustrating the interaction between a client and multiple service providers utilizing the quotation mechanism of the present invention.

Turning to FIG. 2, the client can also obtain quotes from multiple service providers and enter a service contract with the service provider of its choice. This choice is not solely based on price, but also on the levels of service quoted, since the service provider might not be able to supply the service at the requested level. In this example, client 102 sends a request 114 to service provider 104A, 104B and 104C. Service provider 104A provides service 106A and service 108A. Service 106A is provided at service levels 110A and service 108A is provided at service levels 112A. Likewise, service 106B is provided at service levels 110B and service 108B is provided at service levels 112B to service provider 104B. In a similar manner, service 106C is provided at service level 110C and service 108C is provided at service levels 112C to service provider 112C. While service levels 110A, 110B and 110C may overlap, they need not be exact. Service levels 112A, 112B and 112C similarly may be exact, may overlap or may be entirely different.

Moreover, the services themselves may not be exactly the same. Service 106A, 106B and 106C, may merely overlap or may be completely different. Likewise, services 108A, 108B and 108C may be the same, similar, or entirely different. Each of service providers 104A, 104B, and 104C responds to request 114 with quotes 116A, 116B and 116C respectively. Client 102, upon receiving quotes 116A, 116B and 116C may reason among the quotes and enter into a contract with the service provider of choice. As discussed above, appropriate decision mechanism could be used to choose among quotes. It is also within the scope of this invention that client 102 could enter into multiple contracts with each of the service providers 104A, 104B or 104C and split a contract among service providers 104A, 104B and 104C. It is also possible that a client may reject all quotes, and enter into numerous rounds of requests and quotes.

Figure 3:
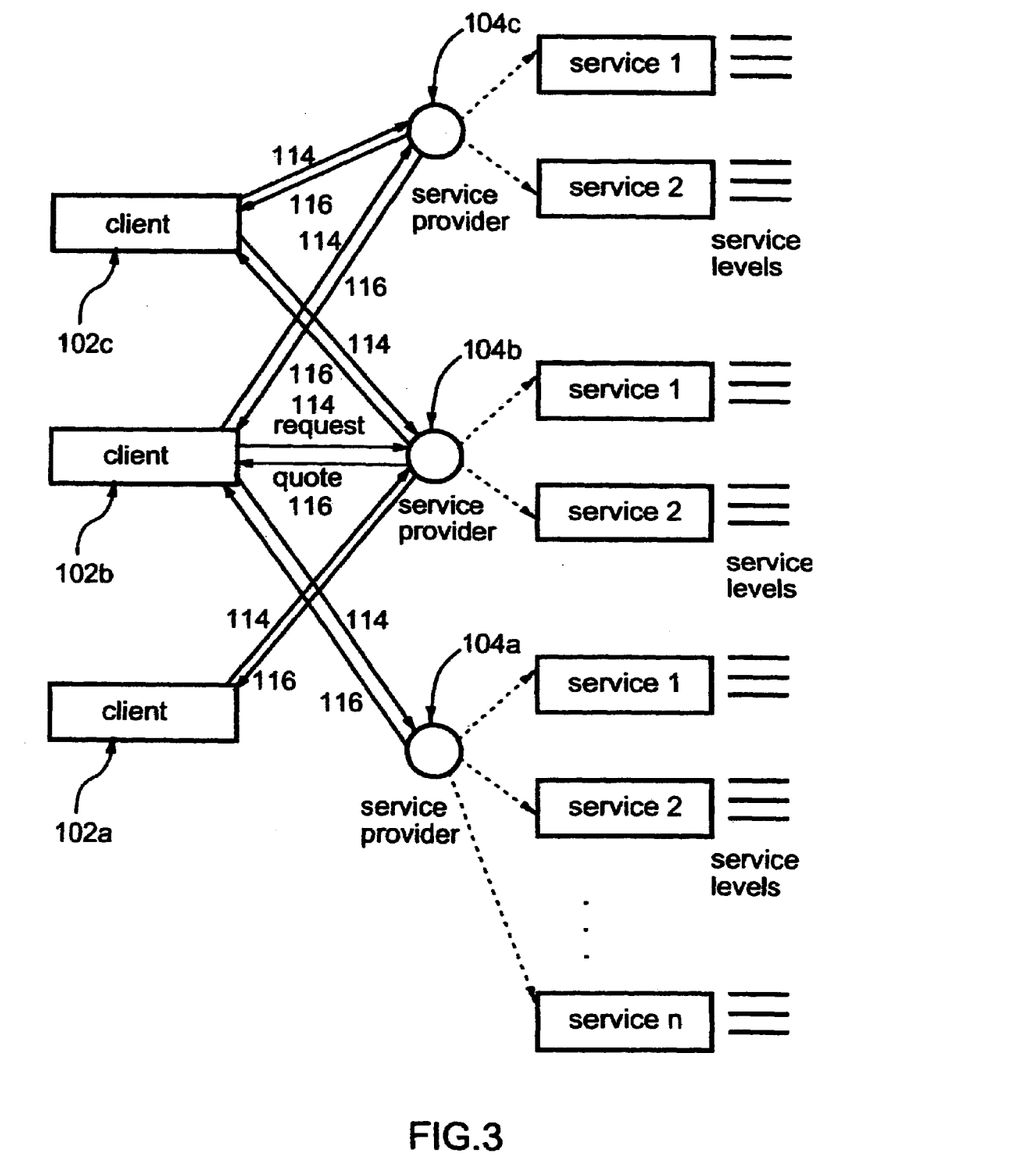
FIG. 3 is a block diagram illustrating the interaction between multiple clients and multiple service providers utilizing the quotation mechanism of the present invention.

Turning to FIG. 3, the operation of the invention in an environment with multiple clients and multiple service providers is better illustrated. Multiple clients, 102A, 102B and 102C are present. In addition, multiple service providers 104A, 104B and 104C are also present. Each service provider 104A, 104B and 104C provides one or more services at multiple service levels. Each service provider can provide services to one or more clients. Each client, 102A, 102B, or 102C can send a request 114 to one or more service providers of its choice. Each service provider, 104A, 104B, 104C can then supply a quote 116 in response to the appropriate request. Each request from each client 102A, 102B, and 102C can be separate and distinct and involve the same, similar or different services from each of service providers 104A, 104B and 104C.

Figure 4:
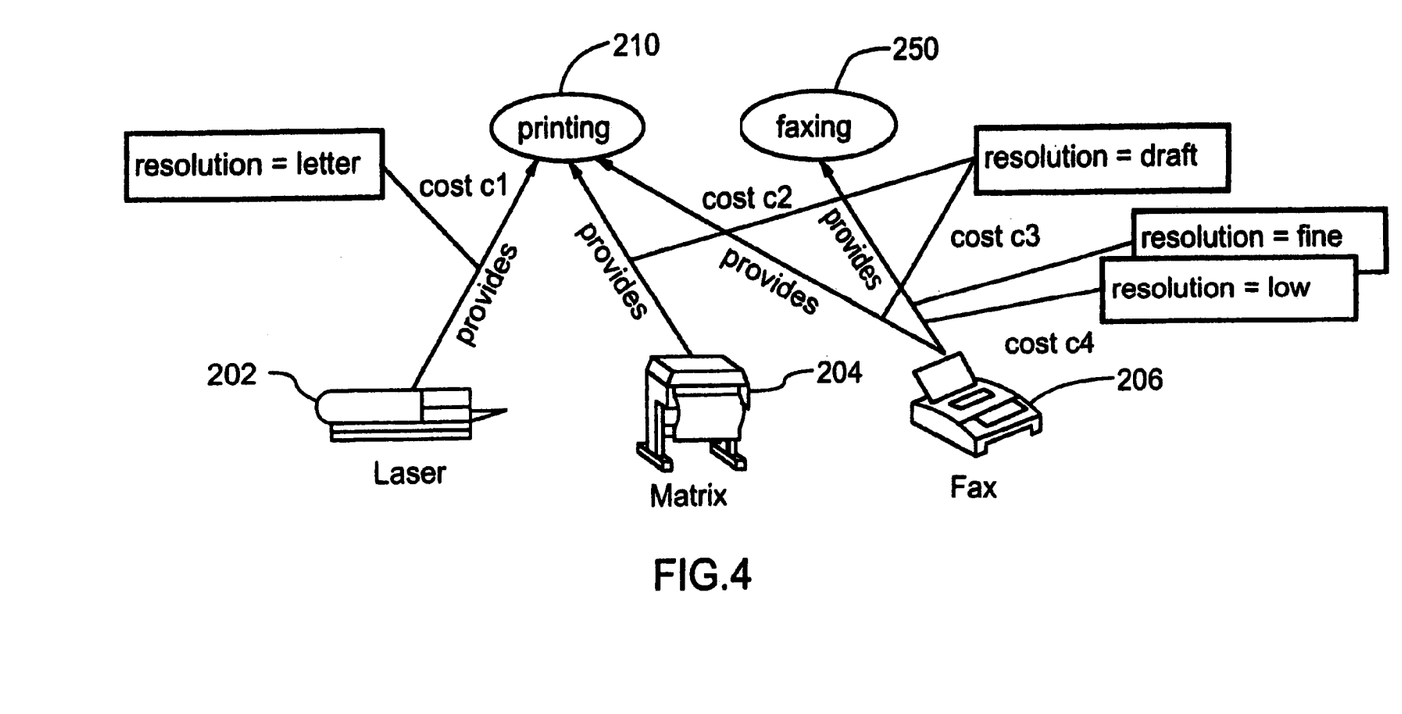
FIG. 4 is a block diagram illustrating a printing service and faxing service utilizing the quotation service of the present invention.

Turning to FIG. 4, the principle of subsumption is better illustrated. To arrive at a modified level of service if the requested level cannot be provided, service providers utilize a subsumption mechanism (step 2004 of FIG. 8). Subsumption is used to find a level of service that can be provided to the client. Service levels are related through a subsumption hierarchy. A service level subsumes another if it provides at least the features (such as reliability, speed etc.) of the other service level. In reply to a request, the service provider's quote specifies the supplied price. If the service can only be provided at a lower level of service the quote also represents which aspects of the client's requirements could not be satisfied. Subsumption is analogous to the substitution principle in economy. It specifies which resources can provide the same service with at least the same level of service as another resource. FIG. 4 illustrates two services, printing service 210 and faxing service 250, and three devices, a laser printer 202, matrix printer 204 and a fax machine 206. The printing service 210 can use laser 202, matrix printer 204, and fax machine 206 to provide its service as all three devices are capable of printing. The printing service 210 is provided at two qualities of resolution, draft and letter. Laser 202 provides a printing quality for printing service 210 with resolution=letter at a cost of C1.

Matrix printer 204 provides a printing quality for printing service 210 with "resolution=draft" at a cost of c2. Fax machine 206 provides a quality for printing service 210 with "resolution=draft" at a cost of c3. Fax machine also provides a faxing quality for faxing service 250 with "resolution=low" for a cost of c4 and a faxing quality with "resolution=five" also at a cost of c4. In FIGS. 4-7, for notational purposes and for clarity we can use an abbreviated notation for service levels. This abbreviated notation uses well known conventions for expressions. For example, instead of the following:

<service-quality>
    <feature name="resolution" value="draft"/>
    <feature name="delay" value="false"/>
    </service-quality> we can alternately use the notation:

resolution= draft & !delay

This expression shows a conjunction (&) of several features. Each feature consists of a name (for example, "resolution") and a value (for example, "draft"), an arithmetic comparison (for example, "speed>14.4"), or a negation (for example, "!delay", which uses the "!" operator generally used in programming languages). If the context is clear, we can leave out the name of the feature, for brevity. The example expression is a formal way of saying "printing at draft, immediately" as previously discussed.

Figure 5A:
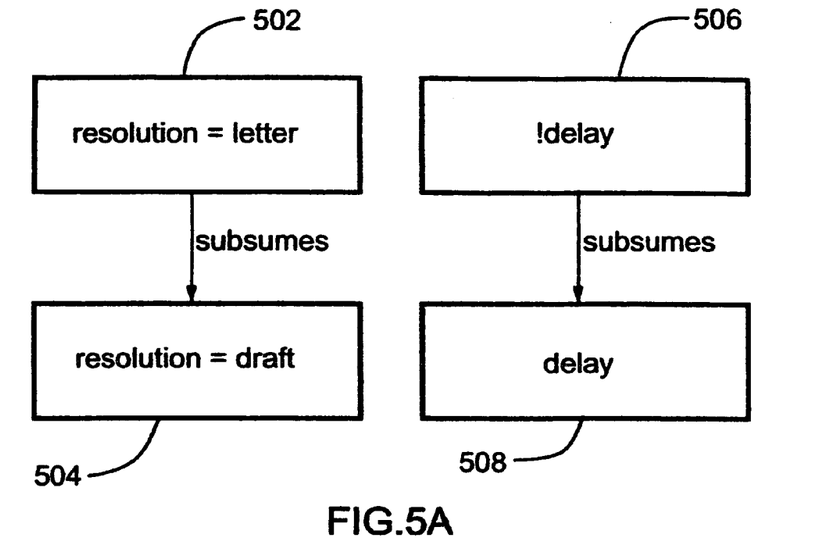
FIGS. 5A and 5B are block diagrams illustrating the principle of subsumption of the printing service and faxing service of FIG. 4.

FIG. 5A illustrates the subsumption hierarchy used in the example of FIG. 4. In FIG. 5A, "resolution=letter" in box 502 subsumes "resolution=draft" in box 504. Likewise, the feature "!delay" in box 506 subsumes the feature "delay" in box 508. Keeping in mind this subsumption hierarchy, referring back to FIG. 4, the printing features of laser printer 202 therefore subsumes the printing services 210 of the matrix printer 204, although the relationship does not hold vice versa. The laser printer 202 also subsumes the printing service offered by the fax machine 206. In cases where the subsumed resource also provides different services, subsumption is true for a subset of services where there is service overlap only. For example, the fax machine 206 prints at draft quality, but the laser printer 202 which subsumes the fax with respect to printing services 210 cannot fax a document.

Figure 5B:
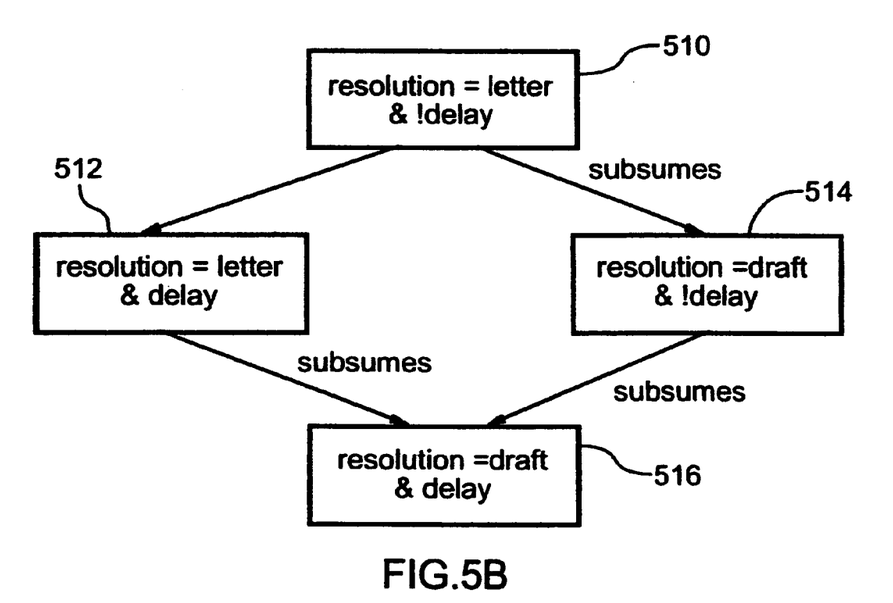

FIG. 5B shows, how two separate subsumption relations of FIG. 5A ("resolution=letter" subsumes "resolution=draft", and "!delay" subsumes "delay") can be merged into one subsumption hierarchy. In FIG. 5B, the features of "resolution=letter" and "!delay" in box 510 subsumes "resolution=letter" and delay in box 512, and "resolution=draft" and "!delay" in box 514. Furthermore, the features in boxes 512 and 514 respectively subsume the services "resolution=draft" and delay in box 516. In abstract terms, the merged hierarchy contains conjunctions of all possible combinations of features.

A conjunction
    A=f1 & f2 & ... fn subsumes a conjunction     B=g1 & g2 & ... gn If each feature in A individually subsumes the corresponding feature in B. Should a feature be unspecified, it is assumed to be the one at the base of its subsumption relation (that is, the feature that does not itself subsume other features). For example, the conjunctions "resolution=draft" and "resolution=draft & delay" are equivalent. It can be inferred from the relation that the value of the feature delay is at least "delay" in the first conjunction.

Operationally, two service levels can be tested for subsumption by executing the following algorithm. The service provider compares each service level at which it provides the requested service (first conjunction) to the requested service level (second conjunction).

1) Take the first feature from each conjunction (assuming that corresponding features are in the same position in each conjunction, which can be easily achieved).
2) If the feature in the first conjunction subsumes the feature in the second conjunction, then proceed at step (1) with the remaining features in each conjunction. When all features have been compared at this point, answer true ("subsumes").
3) If the feature in the first conjunction does not subsume the feature in the second conjunction, answer false ("does not subsume").

Figure 6:
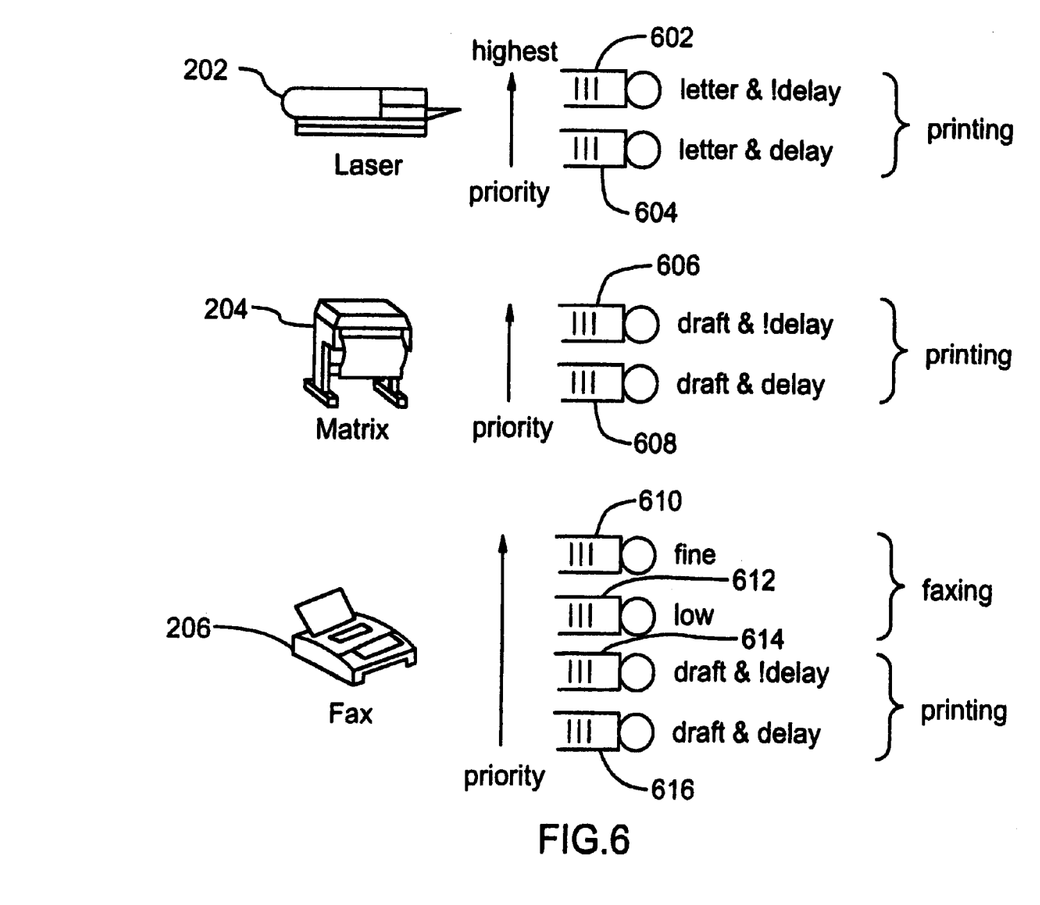
FIG. 6 is a block diagram illustrating how the service providers of FIG. 4 decide the levels of service provided at a given point in time.

FIG. 6 illustrates how a service provider can determine which service levels it can offer at a particular point in time. FIG. 6 shows the services provided by laser printer 202, matrix printer 204 and fax machine 206. Laser printer 202 is shown with two queries, for providing the printing service queue 602 for letter "!delay" and queue 604 for letter & delay. Matrix printer 204 has two queues for the printing service, queue 606 for draft & "!delay" and queue 608 for draft & delay. Fax machine is shown as having four queues. Fax machine 206 has queue 610 and queue 612 for high and low quality of faxing service respectively and queue 614 and queue 616 for draft & "!delay" and draft & delay respectively for the printing service. If matrix printer 204 already has more jobs lined up for processing than it handle given an agreed-upon preset chosen definition of acceptable delay for the service level "!delay", it cannot offer the service level "resolution=draft & !delay".

A service provider or device can be implemented as having a capacity-constrained queue for each service and service level. Requests on these queues are serviced with different priorities, which are set such that requests for a higher level of service get priority over requests for a lower level of service. For example, the laser printer 202 has two queues as shown. Requests on the lower queue 604 are only processed, if there are currently no requests in the upper queue 602.

The queues also only have a finite capacity based on the rate at which the service provider can process the requests. Otherwise, the level of service could not be maintained. For example, the upper queue 602 for the printing service of the laser printer 202 cannot handle more requests per minute, in terms of total pages, than can be printed in one minute, or a suitable fraction thereof, depending on what response time satisfies the "!delay" constraint.

If this capacity is saturated, the service level "resolution=draft & !delay" is no longer available. For example, assume that the laser printer 202 can print 10 ppm, and "!delay" is interpreted as "print 5 pages in no more than 1 min". Then according to queuing theory, the utilization of the printer receiving an average of 5 pages per minute is 50%, and the wait time will equal the processing time. The total time of a 5 page print job spent in either the queue or being printed is thus ½ min+½ min=1 min. Thus, the maximum capacity of the upper queue 602 should be set to requests totaling 5 ppm.

This describes only one possible mechanism for maintaining service levels. More sophisticated mechanisms such as are well known in the art may be employed, one such mechanism is described in co-pending Application No. 9916208.3 filed Jul. 9, 1999, entitled Mechanism for Sharing Guaranteed Resources.

Figure 7:
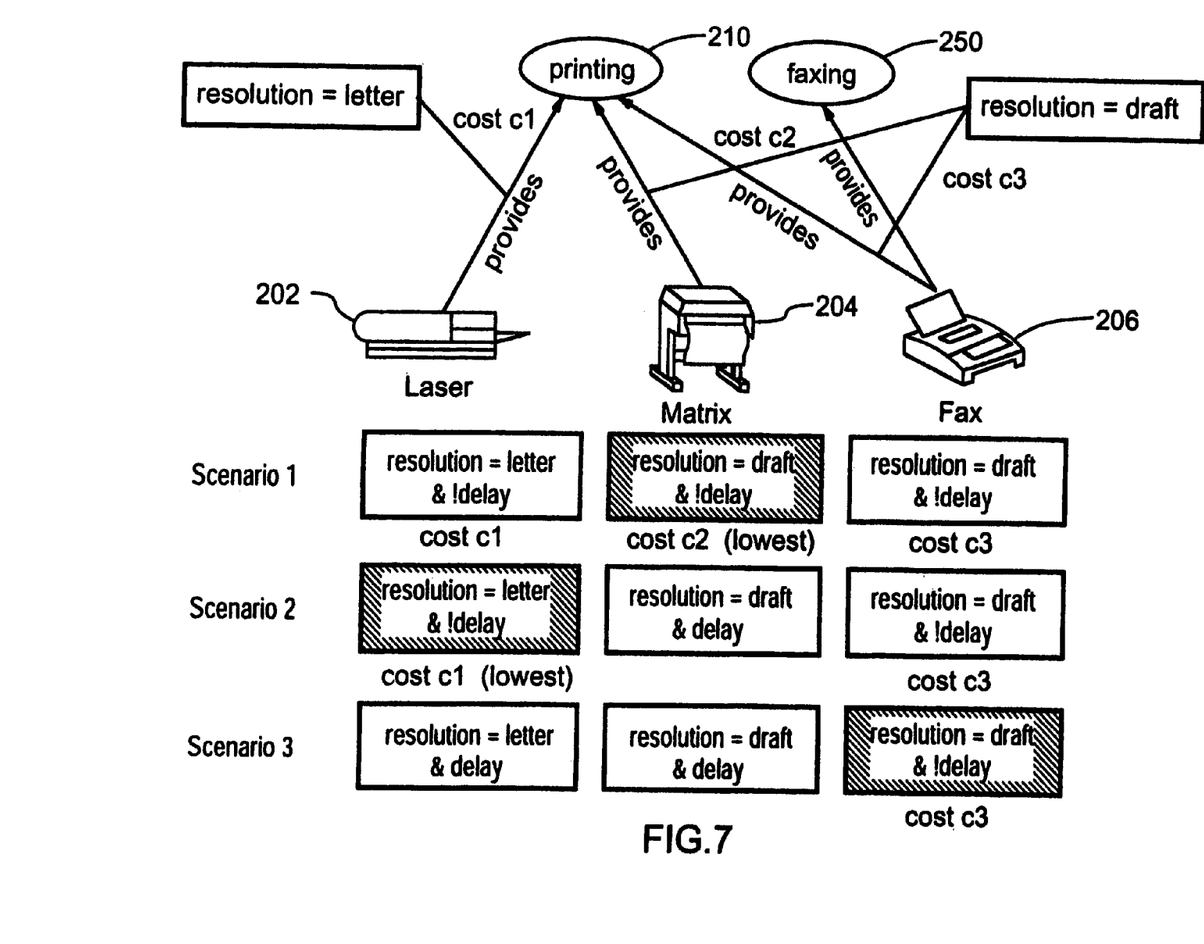
FIG. 7 is block diagram illustrating different service provision scenarios of printing service and faxing service of FIG. 4.

FIG. 7 illustrates three different scenarios for handling the service request "resolution=draft & !delay" described in FIGS. 4-6. The scenarios are as follows:

1) In the first scenario, each of laser printer 202, matrix printer 204 and fax machine 206 can meet the request. The client receives quotes associated with costs c1, c2 and c3 respectively from each of laser printer 202, matrix printer 204 and fax machine 206 respectively. Assuming that c1>c2, and c3>c2, the client selects the matrix printer 204, because it offers the lowest cost.

2) In the second scenario, the total processing time for the matrix printer 204 is above the predefined threshold that defines the service level "!delay" thus the service is not available from that device. The laser printer 202 and the fax machine 206 send quotes to the client. The laser printer 202 is selected as the cheapest provider.

3) In the third scenario, the fax machine 206 is selected, if both the matrix printer 204 and the laser printer 202 have too many queued jobs. Referring to FIG. 6, this option only exists if the fax machine 206 is not currently processing a fax (that is, there are no requests in the two upper queues 610 and 612 of FIG. 6).

Thus, in the example, the situation in the third scenario in FIG. 7—that the laser printer can only provide "resolution=letter & delay"—arises when there are already print jobs for a total of 5 ppm either in the queue or being processed.

The procedure in which a service provider derives the cost for a service at a given service level will now be described in further detail. In one preferred embodiment, we modify a well-known algorithm described in rfc2295.txt for deriving a numerical quality value from quality factors associated with individual features.

In this procedure, the feature components of each service level and a collection of cost factors assigned to the feature components which are stored in a database. The cost factors indicate the relative cost of a feature with respect to the feature at the base of the subsumption hierarchy. If the features at the base of the subsumption hierarchy are assigned a cost factor of 1, other features in the subsumption hierarchy are given cost factors greater than 1, also taking into account their relative importance with regard to other features types (that is, feature with different names) and their characteristics. The relative importance and cost factor may be preset at a desired level at the time the system or device is internalized, or change dynamically.

Some of the cost factors may be technology dependent. For instance, the cost for printing at draft quality is higher for a fax machine (uses special paper) than for a matrix printer (uses ordinary paper). Others, such as the delay experienced by the client are the same across different technologies. The following is an example assignment for the "resolution" feature. A matrix printer can only print at draft quality; therefore, for the feature "draft", for the matrix printer, the cost factor is 1.0.

For a laser printer that prints at "letter" quality the cost factor may be set to 2.0:

| letter | 2.0 |
|---|---|

A fax machine can only print at "draft" quality, however set, at a higher cost of 3.0:

| draft | 3.0 |
|---|---|

For simplicity, we may assign common cost factors for the delay:

| delay | 1.0 |
|---|---|
| !delay | 1.5 |

The cost of providing a service level can then be computed as the product of the cost factors for the features in the service level. Features not explicitly mentioned in the service level expression contribute a cost factor of 1 (same as the base features).

To provide a service at level "resolution=draft & !delay", the following costs would be computed:

| Laser printer | $2 \times 1.5 = 3.0$ |
|---|---|
| Matrix printer | $1 \times 1.5 = 1.5$ |
| Fax machine | $3 \times 1.5 = 4.5$ |

In an alternative embodiment, the client request can also specify a price that the client is willing to pay for the service at the specified level. This may be used to reduce the number of rounds of the negotiation by authorizing the service provider to provide service at up to the specified price limit if required; the service provider doesn't have to ask for the client's permission each time it modified its provided price as long as the provided price stays below the limit. This is analogous to an authorization given to a car shop to go ahead with repairs if the costs of repairs do not exceed a given amount.

ALTERNATE EMBODIMENTS

Standard subsumption hierarchies could be defined in ontologies. Each ontology defines related services and QOS parameters for different application domains. Services and parameters common to application domains can be defined in shared ontologies. An ontology is a vocabulary of features that can be shared among negotiating clients and service providers. Portions of the vocabulary will be specific to some services (for example, features such as resolution), while other features will be applicable to all services (for example, delay). Also, the same feature may assume a different meaning for different services (for example, screen resolution vs. printer resolution). Thus, the ontology maintains a set of common features, and service-specific, possibly overlapping sets of features for each service. For each feature, the ontology also specifies the allowed range of values, which can be either numerical (for example, printer speed in pages per minute) or discrete (for example, printer resolution in terms of draft or letter quality).

Ontologies for software agents as described by Stephen Cranefield and Martin Purvis, Agent-based Integration of General Purpose Tools, 1995, available on-line.

There are different ways of achieving a common ontology of services. In the area of content negotiation, a standard registration authority, such as the Internet Assigned Numbers Authority, or CORBA trading service could be adapted for use to store a vocabulary for the ontology would be used. This authority ensures through a registration process for use by service and clients that the vocabulary are specification are defined in an orderly and well-formed manner. This guarantees interoperability among applications and devices from different vendors.

The use of ontologies would allow the system to reason explicitly about the options in the negotiation process. Subsumption hierarchies can also be reused by customization to the requirements of a specific environment.

Although the invention has been described in terms of the preferred and several alternate embodiments, those skilled in the art will appreciate other modifications and alternation that can be made without departing from spirit and scope of the teachings of the invention. All such modifications are intended to be included within the scope of the claims appended hereto.

The invention claimed is:

1. A computer-based method for providing an electronic service in a service environment of clients and electronic service providers for performing work via computer applications or devices comprising the steps of:
   (a) receiving an electronic request message for electronic service at a client specified price, said request message containing at least one data field representing an electronic service level desired by said client;
   (b) at an electronic service provider, generating a digital subsumption hierarchy of multiple service levels of said electronic service expressed in digital notation, wherein at least one of said service levels subsumes at least another one of said service levels provided that said at least one of said service levels offers at least the same quality of service as said at least another one of said service levels,
   (c) testing a first service level, comprising a first conjunction of features, and a second service level, comprising a second conjunction of features, for subsumption hierarchy;
   (d) determining if each feature in said first conjunction subsumes a corresponding feature in said second conjunction, if each said feature in said first conjunction subsumes said corresponding feature in said second conjunction, said first service level subsumes said second service level, otherwise said first service level does not subsume said second service level, wherein each of said features consist of a name and a value, and an arithmetic comparison or a negation;
   (e) determining a given service level price by deriving a numerical quality value from quality factors associated with each of said features;
   (f) generating an electronic quote message in response to said request, said quote message containing data representing the highest one of said service levels of which an associated one of said service providers is capable of delivering at said specified price and at no less than said service level desired by said client;
   (g) sending said quote message to said client;
   (h) receiving one of either a positive or negative notification message from said client in response to said quote message; and
   (i) providing said electronic service upon receipt of said positive notification message.

2. The method according to claim 1, further comprising the steps of adding a service definition to define a service either dynamically or when the system is initialized.

3. The method according to claim 1 wherein said step of providing said electronic service comprises prioritizing depending on the level of service requested in said electronic request message.

4. The method according to claim 1 further comprising the step of excluding a particular service level from said electronic quote when a capacity is reached.

5. A computer-based method for providing an electronic service quote in a service environment of clients and electronic service providers for performing work via computer applications or devices comprising the steps of:
   (a) receiving an electronic request message for electronic service at a client specified price, said request message containing at least one data field representing an electronic service level desired by said client;
   (b) at an electronic service provider, generating a digital subsumption hierarchy of multiple service levels of said electronic service expressed in digital notation, wherein at least one of said service levels subsumes at least another one of said service levels provided that said at least one of said service levels offers at least the same quality of service as said at least another one of said service levels,
   (c) testing a first service level, comprising a first conjunction of features, and a second service level, comprising a second conjunction of features, for subsumption hierarchy;
   (d) determining if each feature in said first conjunction subsumes a corresponding feature in said second conjunction, if each said feature in said first conjunction subsumes said corresponding feature in said second conjunction, said first service level subsumes said second service level, otherwise said first service level does not subsume said second service level, wherein each of said features consist of a name and a value, and an arithmetic comparison or a negation;
   (e) determining a given service level price by deriving a numerical quality value from quality factors associated with each of said features;
   (f) generating an electronic quote message in response to said request, said quote message containing data representing the highest one of said service levels of which an associated one of said service providers is capable of delivering at said specified price and at no less than said service level desired by said client; and
   (g) sending said quote message to said client.

6. The method according to claim 5, further comprising the steps of:
   (h) receiving one of either a positive or negative notification message from said client in response to said quote message; and
   (i) providing said electronic service upon receipt of said positive notification message.

7. The method according to claim 6, wherein said service provider generates said quote message only if the data representing said highest one of said service levels capable of being delivered by said service provider is at least as high as said service level desired by said client.

* * * * *